United States Patent
Wang et al.

(10) Patent No.: US 10,839,406 B2
(45) Date of Patent: Nov. 17, 2020

(54) A/B TESTING FOR SEARCH ENGINE OPTIMIZATION

(71) Applicant: Microsoft Technology Licensing, LLC, Redmond, WA (US)

(72) Inventors: Quan Wang, San Mateo, CA (US); Huan V. Hoang, San Jose, CA (US); Shen Huang, San Jose, CA (US); Yongzheng Zhang, San Jose, CA (US); Chi-Yi Kuan, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 73 days.

(21) Appl. No.: 16/022,291

(22) Filed: Jun. 28, 2018

(65) Prior Publication Data
US 2020/0005335 A1    Jan. 2, 2020

(51) Int. Cl.
*G06Q 30/02* (2012.01)
*G06F 16/9535* (2019.01)
*G06F 16/2457* (2019.01)

(52) U.S. Cl.
CPC ... *G06Q 30/0201* (2013.01); *G06F 16/24578* (2019.01); *G06F 16/9535* (2019.01)

(58) Field of Classification Search
CPC ............ G06Q 30/0201; G06F 16/9535; G06F 16/24578; G06F 16/957
USPC ....................................................... 705/7.29
See application file for complete search history.

(56) References Cited

U.S. PATENT DOCUMENTS

| | | | |
|---|---|---|---|
| 8,676,799 B1 | 3/2014 | Vaver | |
| 9,032,282 B2* | 5/2015 | Kummer | G06F 11/3672 715/205 |
| 9,842,092 B1* | 12/2017 | Kim | H04L 67/02 |
| 10,067,863 B1 | 9/2018 | Gandhi et al. | |
| 10,394,796 B1* | 8/2019 | Dang | G06F 16/2365 |
| 10,534,851 B1* | 1/2020 | Chan | G06F 16/951 |
| 2009/0282343 A1* | 11/2009 | Catlin | G06Q 30/02 715/738 |
| 2011/0161825 A1* | 6/2011 | Tierney | G06F 11/3672 715/736 |

(Continued)

OTHER PUBLICATIONS

The Ultimate Guide to A/B Testing, Paras Chopra, Smashing Magazine, Jun. 24, 2010, pp. 1-14 (Year: 2010).*

(Continued)

*Primary Examiner* — Timothy Padot
*Assistant Examiner* — Darlene Garcia-Guerra
(74) *Attorney, Agent, or Firm* — Hickman Palermo Becker Bingham LLP

(57) ABSTRACT

The disclosed embodiments provide a system for performing A/B testing for search engine optimization (SEO). During operation, the system divides a set of web pages into a control group, an inbound treatment group, an outbound treatment group, and a full treatment group. Next, the system generates a first set of links from the outbound treatment group to the inbound treatment group and a second set of links within the full treatment group. The system then applies an A/B test to pairs of groups selected from the control group, the inbound treatment group, the outbound treatment group, and the full treatment group. Finally, the system outputs a result of the A/B test for use in assessing an effect of the first and second sets of links on search engine results associated with the set of web pages.

20 Claims, 5 Drawing Sheets

(56) References Cited

U.S. PATENT DOCUMENTS

| | | | |
|---|---|---|---|
| 2012/0191691 A1* | 7/2012 | Hansen | G06F 16/951 707/709 |
| 2013/0132437 A1* | 5/2013 | Park | G06F 16/00 707/780 |
| 2015/0106078 A1* | 4/2015 | Chang | G06F 16/35 704/9 |
| 2015/0186521 A1* | 7/2015 | Yavilevich | G06F 16/951 707/710 |
| 2015/0199010 A1 | 7/2015 | Coleman et al. | |
| 2016/0055261 A1 | 2/2016 | Reinhardt et al. | |
| 2016/0077672 A1 | 3/2016 | Anderson et al. | |
| 2016/0103758 A1* | 4/2016 | Zhao | G06F 8/65 717/124 |
| 2016/0124839 A1* | 5/2016 | Mordo | G06F 11/3692 717/124 |
| 2016/0189207 A1 | 6/2016 | Xu et al. | |
| 2016/0253683 A1 | 9/2016 | Gui et al. | |
| 2017/0124487 A1 | 5/2017 | Szeto et al. | |
| 2017/0308535 A1 | 10/2017 | Agarwal et al. | |
| 2017/0323325 A1 | 11/2017 | Hamedi | |
| 2017/0339229 A1 | 11/2017 | Miller et al. | |
| 2017/0344647 A1* | 11/2017 | Kenthapadi | H04L 67/02 |
| 2017/0357591 A1 | 12/2017 | Gorjiara et al. | |
| 2017/0357697 A1 | 12/2017 | Gorjiara et al. | |
| 2017/0359433 A1 | 12/2017 | Gorjiara et al. | |
| 2018/0060915 A1 | 3/2018 | Liu et al. | |
| 2018/0253649 A1* | 9/2018 | Miikkulainen | G06N 3/126 |
| 2018/0268253 A1 | 9/2018 | Hoffman et al. | |
| 2018/0349362 A1 | 12/2018 | Sharp et al. | |
| 2019/0034964 A1* | 1/2019 | Armbrust | G06Q 30/0277 |
| 2019/0057353 A1* | 2/2019 | Appikatala | G06F 11/3438 |
| 2019/0066664 A1 | 2/2019 | Miller et al. | |
| 2019/0108835 A1 | 4/2019 | Miller et al. | |
| 2019/0113973 A1 | 4/2019 | Coleman et al. | |
| 2019/0236687 A1 | 8/2019 | Tang et al. | |
| 2020/0007934 A1 | 1/2020 | Ortiz et al. | |
| 2020/0065333 A1 | 2/2020 | Epasto et al. | |
| 2020/0104160 A1 | 4/2020 | Ivaniuk et al. | |
| 2020/0104340 A1 | 4/2020 | Liu et al. | |
| 2020/0104383 A1 | 4/2020 | Ivaniuk et al. | |
| 2020/0104396 A1 | 4/2020 | Ivaniuk et al. | |
| 2020/0104398 A1 | 4/2020 | Ivaniuk et al. | |
| 2020/0104407 A1 | 4/2020 | Saint-jacques et al. | |

OTHER PUBLICATIONS

Online Controlled Experiments and A/B Testing, Ron Kohavi and Roger Longbotham, © Springer Science+Business Media New York 2016 C. Sammut, G.I. Webb (eds.), Encyclopedia of Machine Learning and Data Mining, DOI 10.1007/978-1-4899-7502-7 891 (Year: 2016).*

"PageRank", Retrieved from: http://web.archive.org/web/20180511143556/https://en.wikipedia.org/wiki/PageRank, Retrieved Date: May 11, 2018, 20 Pages.

"Non Final Office Action Issued in U.S. Appl. No. 16/146,725", dated May 29, 2020, 13 Pages.

"Non-Final Office Action Issued in U.S. Appl. No. 16/146,603", dated Jul. 7, 2020, 21 Pages.

"Non Final Office Action Issued in U.S. Appl. No. 16/146,750", dated Sep. 4, 2020, 18 Pages.

* cited by examiner

A/B TESTING FOR SEARCH ENGINE OPTIMIZATION

BACKGROUND

Field

The disclosed embodiments relate to A/B testing. More specifically, the disclosed embodiments relate to A/B testing for search engine optimization.

Related Art

A/B testing is a standard way to evaluate user engagement or satisfaction with a new service, feature, or product. For example, a website and/or online network may use an A/B test to show two versions of a web page, email, offer, article, social media post, advertisement, layout, design, and/or other information or content to randomly selected sets of users to determine if one version has a higher conversion rate than the other. If results from the A/B test show that a new treatment version performs better than an old control version by a certain amount, the test results may be considered statistically significant, and the new version may be used in subsequent communications with users already exposed to the treatment version and/or additional users.

On the other hand, a number of challenges may preclude the use of conventional A/B testing techniques and methodologies with search engine optimization (SEO) techniques. First, control and treatment variants typically used in an A/B test may be precluded by the existence of a single crawler for a given search engine, which cannot be partitioned into a treatment group and a control group. Second, the linking of all pages in the World Wide Web (WWW) may cause network effect, in which the ranking of a page in search results is affected by the rankings of pages to which the page is closely linked (e.g., within a few hops). Third, the addition of an inbound link to a page to improve the page's ranking in search results may result in a corresponding outbound link on another page, which may act as a confounding factor in the A/B test.

Consequently, SEO techniques may be improved by developing an A/B testing framework for SEO that accounts for the above challenges.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

Figure 1:
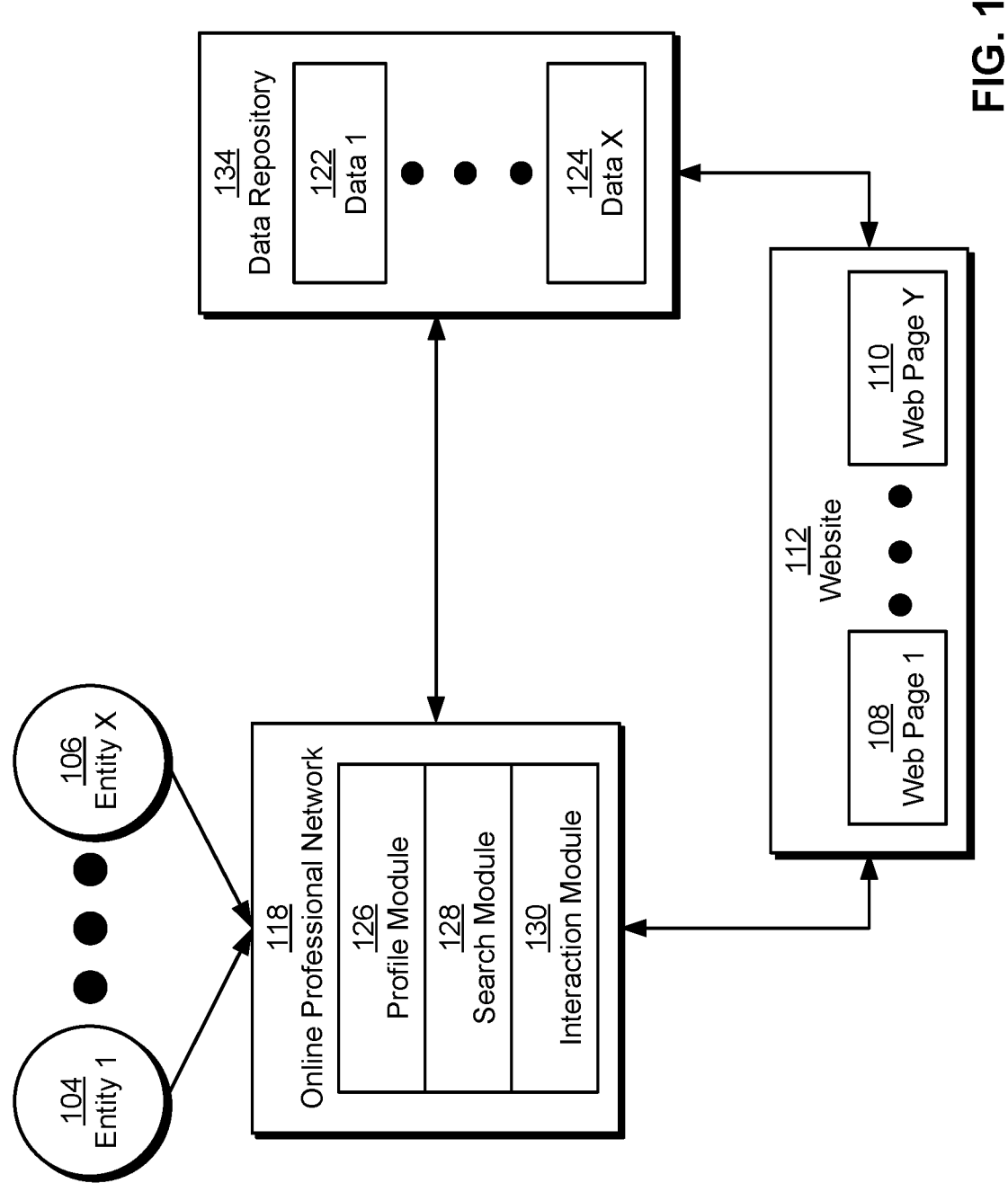
FIG. 1 shows a schematic of a system in accordance with the disclosed embodiments.

The disclosed embodiments provide a method, apparatus, and system for performing A/B testing for search engine optimization (SEO). As shown in FIG. 1, SEO may applied to a website 112 or web pages (e.g., web page 1 108, web page y 110) associated with a user community, such as an online professional network 118 that is used by a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use online professional network 118 to list jobs, search for potential candidates, provide business-related updates to users, advertise, and/or take other action.

More specifically, online professional network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online professional network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online professional network 118 also includes a search module 128 that allows the entities to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature in online professional network 118 to search for profiles, jobs, and/or information by categories such as first name, last name, title, company, school, location, interests, relationship, skills, industry, groups, salary, experience level, etc.

Online professional network 118 further includes an interaction module 130 that allows the entities to interact with one another on online professional network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online professional network 118 may include other components and/or modules. For example, online professional network 118 may include a homepage, landing page, and/or content feed that provides the latest posts, articles, and/or updates from the entities' connections and/or groups to the entities. Similarly, online professional network 118 may include features or mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online professional network 118 may be tracked and stored in a database, data warehouse, cloud storage, and/or other data-storage mechanism providing data repository 134. In another example, data repository 134 may include features that are inputted into machine learning models, scores outputted by the machine learning models, and/or recommendations (e.g., connection recommendations, job recommendations, content recommendations in the content feed, etc.) that are generated based on the scores.

Data in data repository 134 may also, or instead, include web pages (e.g., web page 1 108, web page 110), modules, features, and/or other components of website 112 for accessing and/or using online professional network 118. For example, the web pages may include HyperText Markup Language (HTML) documents that are generated by applications and/or services that provide features and/or functionality of online professional network 118. The applications and/or services may include recommendations, content, images, profile data, job postings, and/or other data from data repository 134 in the web pages and/or generate the web pages based on other data repository 134.

To improve user engagement with online professional network 118, user traffic to online professional network 118, and/or the visibility of online professional network 118, search engine optimization (SEO) may be applied to some or all web pages in website 112. For example, search engine results and/or rankings of web pages in website 112 may be improved by adding inbound links to the web pages, including frequently searched keywords in the web pages, and/or adding keywords to metadata for the web pages.

On the other hand, the effect of SEO on search engine rankings and/or results may be difficult to characterize and/or quantify. First, a conventional A/B testing methodology typically compares the effects of different versions of a page, advertisement, feature, content item, message, and/or email by exposing different groups of users to the versions. On the other hand, a single crawler is used to generate results for a search engine, which precludes isolated exposure of the crawler to only one version of a given web page.

Second, the linking of web pages across website 112 and/or the World Wide Web may result in network effect, in which the search engine ranking of a given web page is affected by the search engine ranking of other web pages to which the web page is directly or indirectly linked. As a result, the effect of SEO on a treatment version of a web page may spill over to other web pages that are connected to the web page, independently of whether the other web pages are in the treatment or control groups of an A/B test.

Third, the addition of an inbound link to a web page automatically produces a corresponding outbound link on another web page that links to the web page. Thus, the effect of the outbound link on the other web page should be taken into account during analysis of SEO techniques that add inbound links to web pages.

Figure 2:
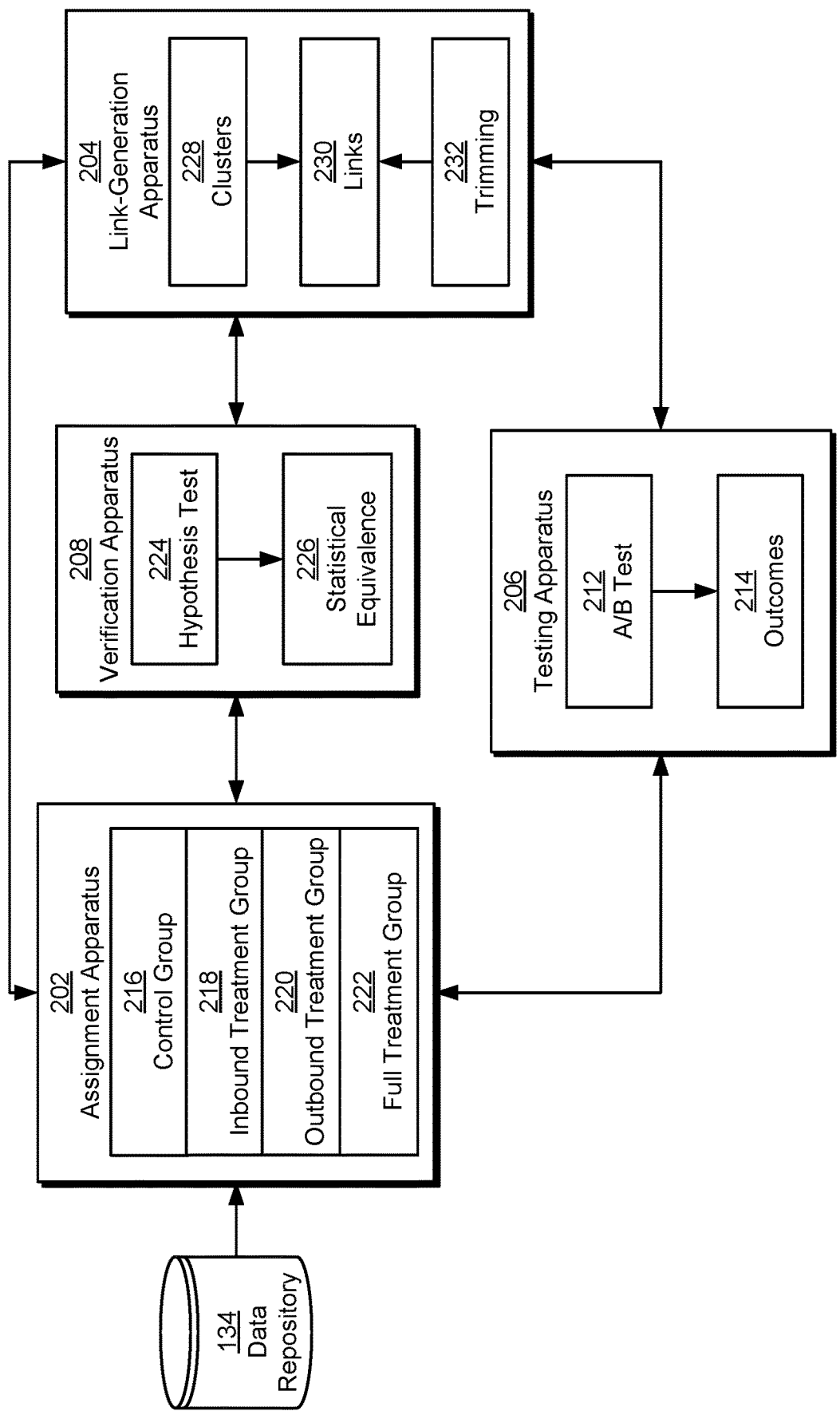
FIG. 2 shows an A/B testing framework for search engine optimization (SEO) in accordance with the disclosed embodiments.

In one or more embodiments, the effect of SEO on search engine rankings of web pages in website 112 is determined in an accurate and/or unbiased manner using an A/B testing framework that accounts for the challenges described above. As shown in FIG. 2, an A/B testing framework may utilize data from data repository 134 to analyze the effects of SEO techniques on web pages in a website (e.g., website 112 of FIG. 1). The A/B testing framework may be provided by and/or used with the website and/or an online network associated with the website (e.g., online professional network 118 of FIG. 1). The A/B testing framework includes an assignment apparatus 202, a verification apparatus 208, a link-generation apparatus 204, and a testing apparatus 206. Each of these components is described in further detail below.

Assignment apparatus 202 divides a set of web pages in the website into a control group 216, an inbound treatment group 218, an outbound treatment group 220, and a full treatment group 222. The set of web pages may include some or all web pages in the website. For example, the web pages may include job postings and/or job search results in a job search module of an online professional network; profile pages containing member, company, school, and/or group profiles in the online professional network; and/or articles published by members of the online professional network. In another example, the web pages may be selected from and/or included in a product to be improved with respect to visibility, engagement, and/or usage.

Control group 216, inbound treatment group 218, outbound treatment group 220, and full treatment group 222 represent different groups of web pages to be compared in an A/B test 212 for SEO. Control group 216 may include web pages that are not affected by inbound or outbound links in the A/B test, inbound treatment group 218 may include web pages that are affected only by inbound links, outbound treatment group 220 may include web pages that are affected only by outbound links, and full treatment group 222 may include web pages that are affected by both inbound and outbound links. As a result, new inbound or outbound links may be omitted from control group 216, inbound links may be added to inbound treatment group 218, outbound links may be added to outbound treatment group 220, and both inbound and outbound links may be added to full treatment group 222. Links among the web pages that existed before A/B test 212 may be used as a baseline for measuring the effects of inbound and/or outbound links on outcomes 214 associated with A/B test 212, such as metrics that are tracked and/or compared across the groups using A/B test 212.

More specifically, assignment apparatus 202 may generate control group 216, inbound treatment group 218, outbound treatment group 220, and full treatment group 222 by randomly assigning each web page to one of the groups. For example, assignment apparatus 202 may use a hash function, simple randomization, block randomization, stratified randomization, and/or other random assignment technique to place web pages in the four groups used to perform A/B test 212.

After the web pages are randomly divided among control group 216, inbound treatment group 218, outbound treatment group 220, and full treatment group 222, verification apparatus 208 may perform a hypothesis test 224 to verify the statistical equivalence 226 of one or more outcome variables across the four groups. For example, verification apparatus 208 may perform a student's t-test, z-test, analysis of variance (ANOVA) test, and/or other type of statistical hypothesis test 224 to determine if differences in index rates, crawl rates, user engagement metrics (e.g., click-through rates (CTRs), view rates, session length, number of sessions, log in rates, job application rates, job search rates, etc.), and/or other outcome variables associated with A/B test 212 are statistically significant (e.g., if the differences have p-values of less than 0.05 or 0.01).

When the outcome variables are not statistically equivalent across control group 216, inbound treatment group 218, outbound treatment group 220, and full treatment group 222, assignment apparatus 202 may generate a new assignment of web pages to the four groups and/or reassign a subset of web pages from one group to another. Verification apparatus 208 may then perform another hypothesis test 224 to determine if statistical equivalence 226 is found in outcome variables associated with the new and/or revised assignments. Assignment apparatus 202 and verification apparatus 208 may iteratively generate random assignments of web pages to control group 216, inbound treatment group 218, outbound treatment group 220, and full treatment group 222 and compare one or more outcome variables across the four groups until statistical equivalence 226 of the outcome variables is verified. In turn, assignment apparatus 202 and verification apparatus 208 may reduce and/or eliminate bias associated with assignment to groups in a controlled experiment and subsequent inaccuracy of results derived from the controlled experiment.

Link-generation apparatus 204 then generates a set of links 230 between pairs of web pages in A/B test 212. For example, link-generation apparatus 204 may connect pairs of web pages in A/B test 212 by adding a link from a first page in each pair to a second page in the pair. Each added link may act as an outbound link that navigates away from the first page and an inbound link that navigates to the second page.

Link-generation apparatus 204 may additionally create links 230 within clusters 228 of relevant web pages. For example, link-generation apparatus 204 and/or another component of the framework may calculate and/or retrieve a set of relevance scores between pairs of web pages containing job postings that are displayed in an employment website and/or online professional network. The relevance scores may be calculated using a machine learning model, weighted sum, and/or other type of statistical analysis technique. Inputs used in calculating each relevance score may include attributes and/or comparisons of attributes from a pair of job postings. Such attributes may include, but are not limited to, the location, industry, popularity, recency, title, seniority, responsibilities, skills, and/or other fields found in the job postings.

Continuing with the previous example, the component may use the relevance scores to generate clusters 228 of web pages that are relevant to one another. For example, the component may use k-means clustering, density-based spatial clustering of applications with noise (DBSCAN), hierarchical clustering, and/or another clustering technique to produce clusters 228 of web pages from the corresponding relevance scores. Each cluster may contain a subset of web pages that are relevant to one another. After clusters 228 are produced, link-generation apparatus 204 may add links 230 that connect some or all pairs of web pages within each cluster, independently of the assignment of the web pages to control group 216, inbound treatment group 218, outbound treatment group 220, and full treatment group 222.

Link-generation apparatus 204 and/or another component may optionally omit the generation of clusters 228 prior to adding links 230 to the web pages. For example, the component may add links 230 between pairs of web pages that have high relevance scores with one another, independently of any clustering of the web pages based on the relevance scores.

By generating links 230 among web pages that are relevant to one another, link-generation apparatus 204 may improve the quality of links 230 added to the web pages, which may further enhance SEO associated with the web pages and/or user engagement with the web pages. For example, links 230 that are added to connect web pages containing related job postings may improve the rankings of the job postings in search engine results, the usefulness of links 230 to job seekers interacting with the job postings, and/or user engagement with the job postings.

Link-generation apparatus 204 may then perform trimming 232 of links 230 to ensure that links 230 conform to constraints associated with assignments of the web pages to control group 216, inbound treatment group 218, outbound treatment group 220, and full treatment group 222. For example, link-generation apparatus 204 may remove both inbound and outbound links from web pages in control group 216, outbound links from web pages in inbound treatment group 218, and inbound links to web pages in outbound treatment group 220.

Finally, a testing apparatus 206 performs A/B test 212 using assignments of web pages to control group 216, inbound treatment group 218, outbound treatment group 220, and full treatment group 222 and links 230 added to the web pages. More specifically, testing apparatus 206 may use A/B test 212 to compare outcomes 214 between pairs of groups selected from control group 216, inbound treatment group 218, outbound treatment group 220, and full treatment group 222. As mentioned above, outcomes 214 may be assessed using crawl rates and/or index rates associated with a crawler used to produce search engine results from the web pages and/or user engagement metrics such as CTRs, view rates, session length, number of sessions, log in rates, job application rates, job search rates, and/or other metrics related to interaction with content in the web pages.

In turn, A/B test 212 may be used to determine if outcomes 214 between a given pair of groups is statistically significant. For example, A/B test 212 may be used to compare outcomes 214 between a pair of groups containing control group 216 and inbound treatment group 218 and/or another pair of groups containing outbound treatment group 220 and full treatment group 222 to assess an inbound effect of links 230 on search engine results and/or associated metrics. In another example, A/B test 212 may be applied to a pair of groups containing control group 216 and outbound treatment group 220 and/or another pair of groups containing inbound treatment group 218 and full treatment group 222 to assess an outbound effect of links 230 on search engine results and/or associated metrics. In a third example, A/B test 212 may be applied to a pair of groups containing control group 216 and full treatment group 222 to assess an overall effect of both inbound and outbound links 230 on search engine results and/or associated metrics. In a fourth example, an A/A test may be performed on web pages in control group 216 to characterize the network effect associated with adding links 230 to web pages in inbound treatment group 218, outbound treatment group 220, and full treatment group 222.

Testing apparatus 206 may also account for the structure of links 230 during analysis of outcomes 214 associated with A/B test 212. For example, testing apparatus 206 may create a regression model that relates outcomes 214 (e.g., clicks, sessions, indexes, crawls, etc.) of A/B test 212 to the number of inbound and/or outbound links 230 associated with each web page. In turn, testing apparatus 206 may use one or more coefficients of the regression model to determine the effect of a single inbound and/or outbound link on metrics related to outcomes 214.

Testing apparatus 206 and/or another component may then output outcomes 214 and/or other results of A/B test 212 to improve search engine rankings, visibility, and/or user engagement associated with the web pages. For example, the component may display, store, and/or transmit metrics that are used to determine outcomes 214 related to the comparison of pairs of groups selected from control group 216, inbound treatment group 218, outbound treatment group 220, and full treatment group 222. In another example, the component may gradually ramp up the assignment of additional web pages to inbound treatment group 218, outbound treatment group 220, and/or full treatment group 222 when the addition of links 230 added to inbound treatment group 218, outbound treatment group 220, and/or full treatment group 222 indicate improved outcomes 214 and/or search engine results for the corresponding web pages.

By conducting A/B test 212 using unbiased assignments of web pages to control group 216, inbound treatment group 218, outbound treatment group 220, and full treatment group 222 and adding links 230 according to the assignments and measures of relevance among the web pages, the system of FIG. 2 may allow the effect of SEO on search engine results of web pages to be determined using controlled experiments. In addition, the system may conduct A/B test 212 in a way that accounts for the generation of search engine results using a single crawler and/or search engine, network effect resulting from adding links 230 to the web pages, and/or the effects of both inbound and outbound links 230 on the search engine results. Consequently, the system may improve technologies related to SEO, A/B testing, and/or increasing user engagement with websites or online networks, as well as the performance of applications, computer systems, and/or network-enabled devices on which the technologies execute.

Those skilled in the art will appreciate that the system of FIG. 2 may be implemented in a variety of ways. First, assignment apparatus 202, link-generation apparatus 204, testing apparatus 206, verification apparatus 208, and/or data repository 134 may be provided by a single physical machine, multiple computer systems, one or more virtual machines, a grid, one or more databases, one or more filesystems, and/or a cloud computing system. Assignment apparatus 202, link-generation apparatus 204, testing apparatus 206, and/or verification apparatus 208 may additionally be implemented together and/or separately by one or more hardware and/or software components and/or layers.

Second, outcomes 214, web pages, and/or other data used by the system may be obtained from a number of data sources. For example, data repository 134 may include data from a cloud-based data source such as a Hadoop Distributed File System (HDFS) that provides regular (e.g., hourly) updates to data associated with connections, people searches, job search activity, and/or profile views. Data repository 134 may also include data from an offline data source such as a Structured Query Language (SQL) database, which refreshes at a lower rate (e.g., daily) and provides data associated with profile content (e.g., profile pictures, summaries, education and work history) and/or profile completeness.

Third, the system may be adapted to A/B testing and/or other types of controlled experiments related to SEO of various types of websites and/or web pages. For example, the system of FIG. 2 may be used to characterize the effects of inbound and/or outbound links and/or other types of SEO techniques on different features and/or versions of websites, social networks, applications, platforms, advertisements, recommendations, and/or other components that impact user experiences and/or search engine rankings.

Figure 3:
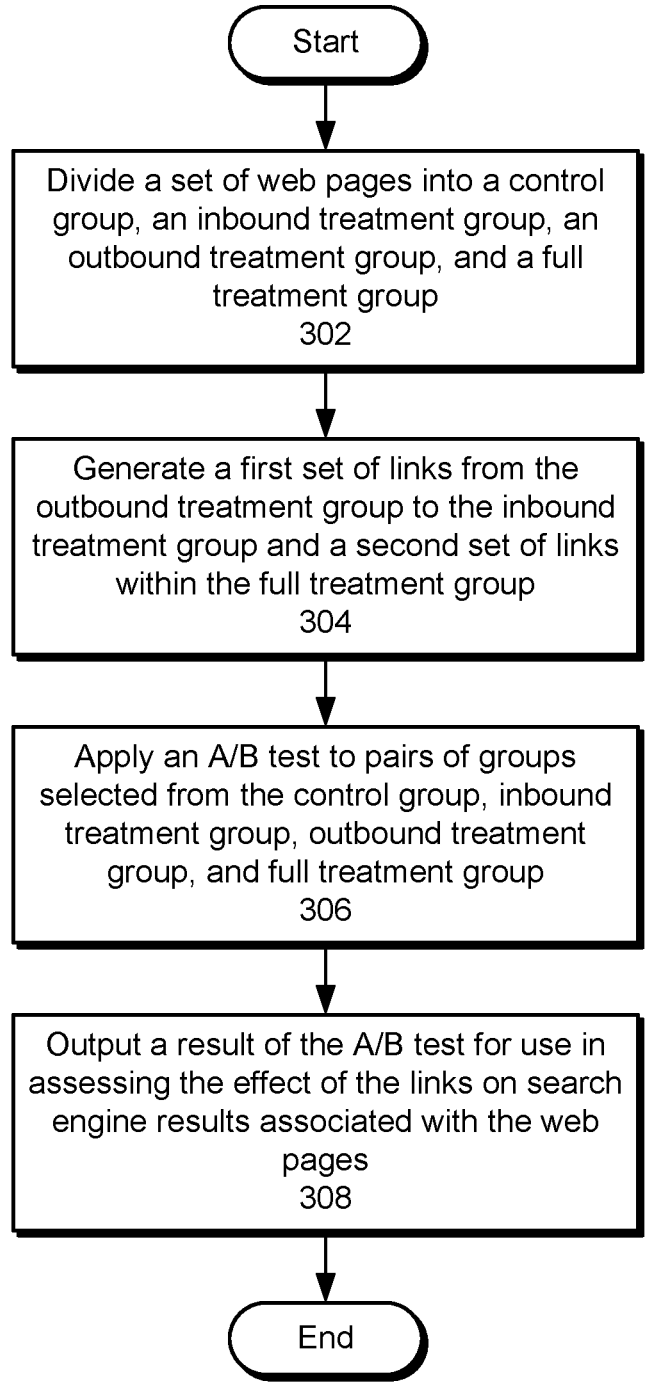
FIG. 3 shows a flowchart illustrating a process of performing A/B testing for SEO in accordance with the disclosed embodiments.

FIG. 3 shows a flowchart illustrating a process of performing A/B testing for SEO in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a set of web pages is divided into a control group, an inbound treatment group, an outbound treatment group, and a full treatment group (operation 302). For example, each web page may be randomly assigned to one of the four groups.

After all web pages have been divided into the four groups, the statistical equivalence of one or more outcome variables is verified across the control group, inbound treatment group, outbound treatment group, and full treatment group. For example, a hypothesis test may be applied to outcome variables associated with SEO of the web pages to verify that outcome variables such as index rates, crawl rates, and/or user engagement metrics are statistically equivalent across the four groups.

Next, a first set of links from the outbound treatment group to the inbound treatment group and a second set of links within the full treatment group are generated (operation 304), as described in further detail below with respect to FIG. 4. An A/B test is then applied to pairs of groups selected from the control group, inbound treatment group, outbound treatment group, and full treatment group (operation 306). For example, the A/B test may be applied to the control group and the inbound treatment group and/or the outbound treatment group and the full treatment group to assess an inbound effect of the links on the search engine results. In another example, the A/B test may be performed using the control group and the outbound treatment group and/or the inbound treatment group and the full treatment group to assess an outbound effect of the links on the search engine results. In a third example, the A/B test may be applied to the control group and the full treatment group to assess an overall effect of the links on the search engine results. In a fourth example, an A/A test may be performed on the control group to assess a network effect associated with links added to the other groups.

Finally, a result of the A/B test is outputted for use in assessing the effect of the links on search engine results associated with the web pages (operation 308). For example, one or more outcome variables associated with the A/B test may be regressed to the number of inbound and/or outbound links associated with values of the outcome variables. In turn, one or more regression coefficients may be outputted with or without the values of the outcome variables to characterize the effect of individual inbound or outbound links and/or a certain number of inbound or outbound links on the outcome variables. In another example, a result of the A/B test that is positively correlated with an increase in user engagement, crawl rate, index rate, and/or another outcome variable may be used to automatically ramp up assignment of web pages to the group (e.g., outbound treatment group, inbound treatment group, full treatment group, etc.) associated with the result.

Figure 4:
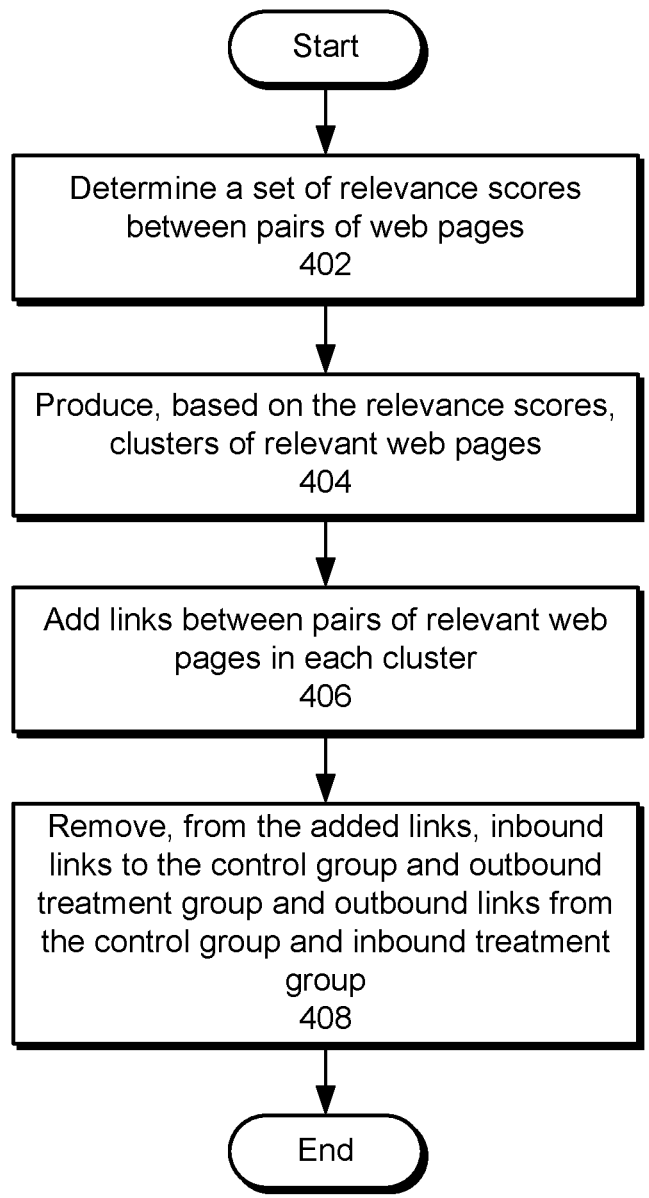
FIG. 4 shows a flowchart illustrating a process of generating links between web pages used in A/B testing for SEO in accordance with the disclosed embodiments.

FIG. 4 shows a flowchart illustrating a process of generating links between web pages used in A/B testing for SEO in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a set of relevance scores is determined between pairs of web pages (operation 402). For example, the relevance scores may be calculated based on attributes associated with job listings in the web pages. Such attributes may include, but are not limited to, locations, industries, titles, responsibilities, seniorities, skills, and/or other fields in the job listings. In another example, the relevance scores may be calculated based on semantic similarity and/or matches between keywords, metadata, and/or other content in pairs of web pages.

Next, clusters of relevant web pages are produced based on the relevance scores (operation 404). For example, a clustering technique may be used to generate clusters of web pages that have relevance scores with one another that exceed a threshold.

Links between pairs of relevant web pages in each cluster are then added (operation 406). For example, some or all pairs of web pages in each cluster may be connected via one or more links, independently of the assignment of the web pages to a control group, an inbound treatment group, an outbound treatment group, and a full treatment group in the A/B test. Each link may act as an outbound link from a first web page in a given pair of web pages and as an inbound link to a second web page in the same pair of web pages.

Finally, inbound links to the control group and outbound treatment group and outbound links from the control group and inbound treatment group are removed from the added links (operation 408). Continuing with the above example, a link added to a pair of web pages in operation 406 may be removed in operation 408 if the link is an outbound or inbound link for a web page in the control group, an outbound link for a web page in the inbound treatment group, and/or an inbound link for a web page in the outbound treatment group. After the links are selectively trimmed according to assignments of the web pages to the four groups used in the A/B test, the A/B test may be performed to assess the effect of the added links on user engagement metrics, index rates, crawl rates, and/or other outcome variables associated with the A/B test, as discussed above.

Figure 5:
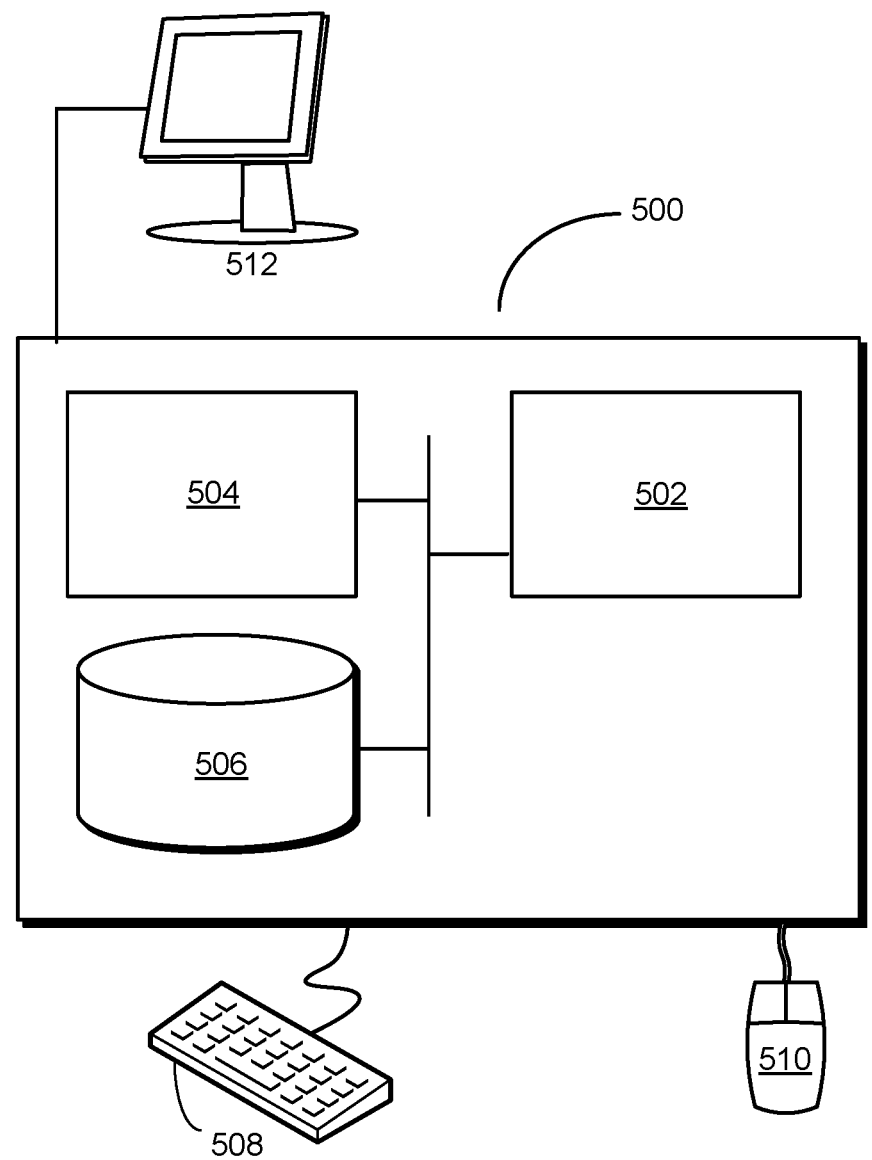
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the disclosed embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for performing A/B testing for SEO. The system includes an assignment apparatus, a verification apparatus, a link-generation apparatus, and a testing apparatus, one or more of which may alternatively be termed or implemented as a module, mechanism, or other type of system component. The assignment apparatus divides a set of web pages into a control group, an inbound treatment group, an outbound treatment group, and a full treatment group. Next, the verification apparatus verifies a statistical equivalence of one or more outcome variables across the control group, the inbound treatment group, the outbound treatment group, and the full treatment group. The link-generation apparatus then generates a first set of links from the outbound treatment group to the inbound treatment group and a second set of links within the full treatment group. Finally, the testing apparatus applies an A/B test to pairs of groups selected from the control group, the inbound treatment group, the outbound treatment group, and the full treatment group. The testing apparatus also outputs a result of the A/B test for use in assessing an effect of the first and second sets of links on search engine results associated with the set of web pages.

In addition, one or more components of computer system 500 may be remotely located and connected to the other components over a network. Portions of the present embodiments (e.g., assignment apparatus, verification apparatus, link-generation apparatus, testing apparatus, data repository, website, online professional network, etc.) may also be located on different nodes of a distributed system that implements the embodiments. For example, the present embodiments may be implemented using a cloud computing system that performs A/B testing of SEO for a set of remote web pages.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method comprising:
   dividing, by one or more computer systems, a set of web pages into a control group, an inbound treatment group, an outbound treatment group, and a full treatment group;
   wherein the control group includes one or more webpages that are not affected by inbound links or outbound links in an A/B test;
   wherein the inbound treatment group includes one or more webpages that are affected by inbound links in the A/B test but not affected by outbound links in the A/B test;
   wherein the outbound treatment group includes one or more webpages that are affected by outbound links in the A/B test but not affected by inbound links in the A/B test;
   wherein the full treatment group includes one or more webpages that are affected by inbound links and outbound links in the A/B test;
   generating, by the one or more computer systems, a first set of links from the outbound treatment group to the inbound treatment group and a second set of links within the full treatment group;
   applying the A/B test to pairs of groups selected from the control group, the inbound treatment group, the outbound treatment group, and the full treatment group; and
   outputting a result of the A/B test for use in assessing an effect of the first and second sets of links on search engine results, or user engagement metrics, associated with the set of web pages.

2. The method of claim 1, wherein dividing the set of web pages into the control group, the inbound treatment group, the outbound treatment group, and the full treatment group comprises:
   randomly assigning each web page in the set of web pages to a group selected from the control group, the inbound treatment group, the outbound treatment group, and the full treatment group; and
   verifying a statistical equivalence of one or more outcome variables across the control group, the inbound treatment group, the outbound treatment group, and the full treatment group.

3. The method of claim 2, wherein the one or more outcome variables comprise at least one of:
   a user engagement metric;
   an index rate; or
   a crawl rate.

4. The method of claim 1, wherein generating the first and second sets of links comprises:
   generating a set of links between pairs of web pages in the set of web pages; and
   removing, from the set of links, inbound links to the control group and outbound links from the control group.

5. The method of claim 4, wherein generating the first and second sets of links further comprises:
   removing, from the set of links, additional outbound links from the inbound treatment group and additional inbound links to the outbound treatment group.

6. The method of claim 1, wherein generating the first and second sets of links comprises:
   determining a set of relevance scores between pairs of web pages in the set of web pages; and
   generating, based on the set of relevance scores, the set of links to connect pairs of relevant web pages in the set of web pages.

7. The method of claim 6, wherein generating the set of links to connect the pairs of relevant web pages comprises:
   producing, based on the set of relevance scores, a set of clusters of relevant web pages from the set of web pages; and
   for each cluster in the set of clusters, adding links between the pairs of relevant web pages in said each cluster.

8. The method of claim 1, wherein applying the A/B test to the pairs of groups selected from the control group, the inbound treatment group, the outbound treatment group, and the full treatment group comprises:
   performing the A/B test on the control group and the inbound treatment group to assess an inbound effect of the first set of links on the search engine results.

9. The method of claim 1, wherein applying the A/B test to the pairs of groups selected from the control group, the inbound treatment group, the outbound treatment group, and the full treatment group comprises:
   performing the A/B test on the outbound treatment group and the full treatment group to assess an inbound effect of the first and second sets of links on the search engine results.

10. The method of claim 1, wherein applying the A/B test to the pairs of groups selected from the control group, the inbound treatment group, the outbound treatment group, and the full treatment group comprises:
    performing the A/B test on the control group and the outbound treatment group to assess an outbound effect of the first set of links on the search engine results.

11. The method of claim 1, wherein applying the A/B test to the pairs of groups selected from the control group, the inbound treatment group, the outbound treatment group, and the full treatment group comprises:
    performing the A/B test on the inbound treatment group and the full treatment group to assess an outbound effect of the first and second sets of links on the search engine results.

12. The method of claim 1, wherein applying the A/B test to the pairs of groups selected from the control group, the inbound treatment group, the outbound treatment group, and the full treatment group comprises:
    performing the A/B test on the control group and the full treatment group to assess an overall effect of the second set of links on the search engine results.

13. The method of claim 1, wherein applying the A/B test to the pairs of groups selected from the control group, the inbound treatment group, the outbound treatment group, and the full treatment group comprises:
    performing an A/A test on the control group to assess a network effect associated with the first and second sets of links.

14. The method of claim 1, wherein the effect of the first and second sets of links is on search engine results associated with the set of web pages.

15. A system, comprising:
one or more processors; and
memory storing instructions that, when executed by the one or more processors, cause the system to:
- divide a set of web pages into a control group, an inbound treatment group, an outbound treatment group, and a full treatment group;
- wherein the control group includes one or more webpages that are not affected by inbound links or outbound links in an A/B test;
- wherein the inbound treatment group includes one or more webpages that are affected by inbound links in the A/B test but not affected by outbound links in the A/B test;
- wherein the outbound treatment group includes one or more webpages that are affected by outbound links in the A/B test but not affected by inbound links in the A/B test;
- wherein the full treatment group includes one or more webpages that are affected by inbound links and outbound links in the A/B test;
- generate a first set of links from the outbound treatment group to the inbound treatment group and a second set of links within the full treatment group;
- apply the A/B test to pairs of groups selected from the control group, the inbound treatment group, the outbound treatment group, and the full treatment group; and
- output a result of the A/B test for use in assessing an effect of the first and second sets of links on search engine results, or user engagement metrics, associated with the set of web pages.

16. The system of claim 15, wherein dividing the set of web pages into the control group, the inbound treatment group, the outbound treatment group, and the full treatment group comprises:
- randomly assigning each web page in the set of web pages to a group selected from the control group, the inbound treatment group, the outbound treatment group, and the full treatment group; and
- verifying a statistical equivalence of one or more outcome variables across the control group, the inbound treatment group, the outbound treatment group, and the full treatment group.

17. The system of claim 15, wherein generating the first and second sets of links comprises:
- generating a set of links between pairs of web pages in the set of web pages;
- removing, from the set of links, inbound links to the control group and outbound links from the control group; and
- removing, from the set of links, additional outbound links from the inbound treatment group and additional inbound links to the outbound treatment group.

18. The system of claim 15, wherein generating the first and second sets of links comprises:
- determining a set of relevance scores between pairs of web pages in the set of web pages;
- producing, based on the set of relevance scores, a set of clusters of relevant web pages from the set of web pages; and
- for each cluster in the set of clusters, adding links between the pairs of relevant web pages in said each cluster.

19. The system of claim 15, wherein applying the A/B test to the pairs of groups selected from the control group, the inbound treatment group, the outbound treatment group, and the full treatment group comprises:
- performing the A/B test on a first pair of groups comprising the control group and the inbound treatment group and a second pair of groups comprising the outbound treatment group and the full treatment group to assess an inbound effect of the first and second sets of links on the search engine results; and
- performing the A/B test on a third pair of groups comprising the control group and the outbound treatment group and a fourth pair of groups comprising the inbound treatment group and the full treatment group to assess an outbound effect of the first and second sets of links on the search engine results.

20. The system of claim 15, wherein applying the A/B test to the pairs of groups selected from the control group, the inbound treatment group, the outbound treatment group, and the full treatment group comprises at least one of:
- performing the A/B test on the control group and the full treatment group to assess an overall effect of the second set of links on the search engine results; and
- performing an A/A test on the control group to assess a network effect associated with the first and second sets of links.

* * * * *